United States Patent [19]

Pazzaglia

[11] Patent Number: 5,451,086
[45] Date of Patent: Sep. 19, 1995

[54] SYSTEM FOR DELIVERING AIR TO AT LEAST ONE SUCTION CUP FORMING PART OF A MACHINE OPERATING AT HIGH SPEED

[75] Inventor: Luigi Pazzaglia, Bologna, Italy

[73] Assignee: Cefin S.p.A., Bologna, Italy

[21] Appl. No.: 125,109

[22] Filed: Sep. 21, 1993

[30] Foreign Application Priority Data

Oct. 14, 1992 [IT] Italy ................ BO92A0362

[51] Int. Cl.⁶ ............................. B66C 1/02
[52] U.S. Cl. ....................... 294/64.1; 271/108
[58] Field of Search .................. 294/64.1–65; 901/40; 251/325; 137/625.25, 625.68, 625.69; 271/108

[56] References Cited

U.S. PATENT DOCUMENTS

| | | | |
|---|---|---|---|
| 949,850 | 2/1910 | Smith | 271/108 X |
| 2,999,715 | 9/1961 | Firestone | 294/64.1 |
| 3,219,380 | 11/1965 | Carliss | 294/64.1 |
| 3,999,795 | 12/1976 | Barker | 294/64.1 |
| 4,340,234 | 7/1982 | Ise | 294/64.1 X |
| 4,624,456 | 11/1986 | Porat | 271/108 X |
| 4,749,219 | 6/1988 | Bolle, Jr. et al. | 294/64.1 |
| 4,925,225 | 5/1990 | Dost | 294/64.1 |
| 5,076,564 | 12/1991 | Marass | 271/108 X |

*Primary Examiner*—Dean Kramer
*Attorney, Agent, or Firm*—Dvorak and Traub

[57] ABSTRACT

A manufacturing machine operating at high speed and using a feed system with suction cups can be fitted with an air delivery system in which the single suction cup is mounted directly to a three-way valve affording a first passage open to the cup, a second passage coupled to a vacuum pump and a third passage connected to a source of compressed air; the second and third passages can be connected in alternation to the first passage, in such a manner that the cup will release swiftly and positively as suction generated by the vacuum pump is neutralized by the rush of air.

7 Claims, 3 Drawing Sheets

SYSTEM FOR DELIVERING AIR TO AT LEAST ONE SUCTION CUP FORMING PART OF A MACHINE OPERATING AT HIGH SPEED

BACKGROUND OF THE INVENTION

The present invention relates to a system for delivering air to at least one suction cup, in a machine operating at high speed.

In particular, the invention relates to a delivery system intended for use in machines for working sheet materials, such as machines designed to weld the hollow cylindrical bodies of tin cans.

It is a conventional feature of automatic machines for working sheet materials, whether metallic or non-metallic, that the material is supplied to the work stations generally by means of suction cups connected to the air lines of a pneumatic system. In operation, the suction cups are connected to vacuum pumps and invested with translatory motion in relation to the sheets, which typically will be stacked one on top of another, before approaching and gripping the sheet of the stack outermost, top or bottom. The single sheet is then separated from the stack by a distancing movement of the cups and translated toward suitable conveyor means supplying the various work stations of the machine.

As the sheet must now be detached from the suction cups to allow further handling, the connection with the vacuum pumps will be cut off at the appropriate moment, and the cups thus vented to the atmosphere. The connections in question are controlled in most instances by means of pneumatically actuated three way valves, forming part of the delivery system, which can be purchased in a wide variety of types and versions.

It has been observed that the use of these valves in machines operating at particularly high speeds, that is, with sheets supplied at a rate of several hundreds per minute, tends to be accompanied by a variety of drawbacks (attributable to shortcomings in the pneumatic control system), which are both of key importance in practical terms and pivotal as regards their combined influence on the functional effectiveness of the machine.

In practice, the time taken to neutralize negative pressure through the suction cups on the completion of each operating cycle tends to be unduly long: a drawback stemming from the length of the pipelines connecting the cups to the valves, which disallows a rapid flow of air through the bore; accordingly, the slow response of the cups on release has to be compensated by using pumps of large capacity which produce only a partial remedy, and at a high cost. It is also very difficult in general to synchronize the action of the suction cups with the work cycles of other sections of an automatic machine running at high production tempo, given that the operating rhythm will be affected even by the slightest of inertia forces, however generated.

With the slowness in response of the suction cups mentioned above, the difficulty in synchronizing pickup and release of the sheet with the operation of the remainder of the machine is much increased, and especially at the moment of release, by reason of the consistent quantity of air that has to be controlled; in effect, the suction cup (together with the corresponding pipeline) functions as a restraint (mechanically as well as pneumatically), even after deactivation of the aspirating effect, for a duration that is by no means negligible.

Taken overall, the drawbacks mentioned above are instrumental in essentially disallowing a genuinely high speed and at the same time precise operation of automatic machines for working sheet materials; in terms of numbers, this signifies that operating speeds of the order of 800–850 strokes per minute are unobtainable, albeit well within the scope of such machines if the right infeed is provided.

Accordingly, the object of the present invention is to provide an air delivery system, connected to at least one suction cup, such as will overcome the drawbacks mentioned above while ensuring precision and dependability in operation of the high speed machines with which the disclosure is concerned. In this context, it is also an important object of the invention to provide a delivery system of the type in question that is simple in construction, inexpensive and easily carried into effect by any operator in the relative industrial sector.

SUMMARY OF THE INVENTION

The stated objects are realized in an air delivery system as recited in the appended claims, by which air is supplied to at least one suction cup forming part of a machine operating at high speed; such a system comprises a three way valve having a first, a second and a third passage, the first connected with the suction cup and the second with suction means, of which the second and third passages can be connected in alternation to the first, whilst the third passage, according to the invention, is also connected to a source of compressed air.

In a preferred embodiment of the system disclosed, the valve is composed of a housing connected to a movable support, providing mechanical support in its turn to at least one suction cup and affording a substantially cylindrical cavity in communication with the suction cup, and a hollow piston slidable coaxially within the cavity against a spring bias; internally, the valve affords a first passage open to the suction cup, a second passage connecting with suction means, and a third passage located near to the suction cup, of which the second and the third can be aligned in alternation with holes afforded by the hollow piston as determined by the position of the piston, whilst externally the valve is associated with mechanical control means serving to synchronize the movements of the piston and the movable support.

To advantage, the third passage of the valve is connected to a source of compressed air.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
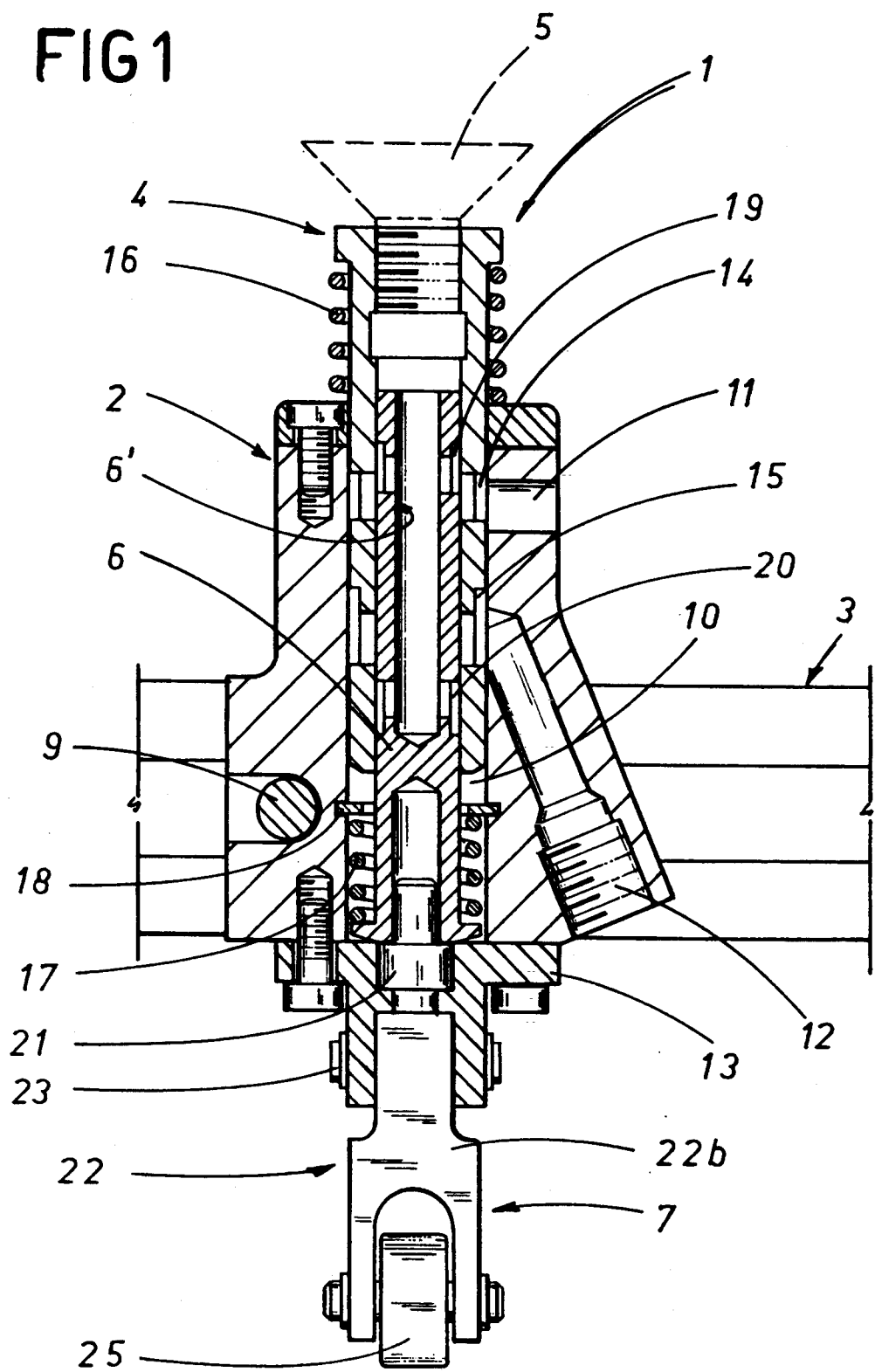
FIG. 1 shows the section through a valve forming part of the air delivery system according to the present invention, and a suction cup connected to the valve.

Referring to the drawings, 100 denotes a system, in its entirety, by means of which to supply air to at least one suction cup 5 forming part of a machine (not illustrated) operating at high speed.

Such a system 100 comprises a valve, denoted 1 in its entirety, composed essentially of a housing 2 carried by a movable support 3, a tubular support 4 insertable into the housing 2 and affording support directly to a suction cup 5, and a hollow piston 6 accommodated slidably within the tubular support 4, of which the movements are produced by mechanical control means 7 associated with a fixed frame 8 forming part of the machine. A top portion of the piston 6 affords a coaxial bore 6' communicating uppermost with the suction cup 5 and constituting a first passage.

Figure 3:
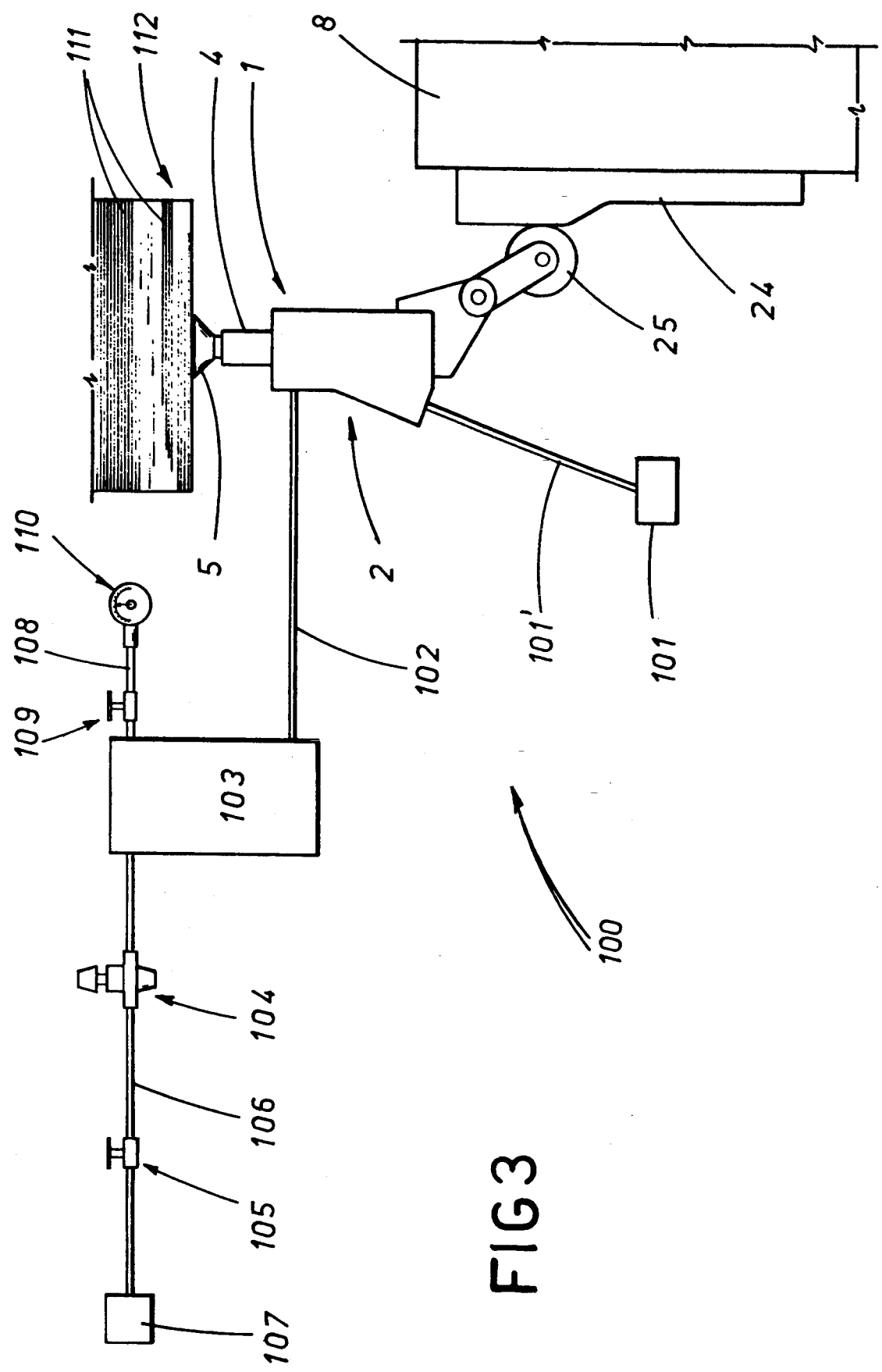
FIG. 3 is a part schematic and part block diagram affording a general view of the air delivery system according to the invention.

More in detail, the valve housing 2 is secured to the movable support 3 by way of a screw connecting element 9, such as will also allow of positioning the valve 1 selectively along the support 3, and presents a hollow structure characterized by a cylindrical cavity 10 with open ends. The cavity 10 is also in communication with a second and a third passage afforded by the value housing 2: the third passage 11, of which the function will be described more specifically in due course, is located close to the end of the cavity nearer the suction cup 5, whilst the second passage 12 occupies a position farther from the suction cup 5 and can be coupled to suction means (not illustrated), connected by way of a pipeline 101' to a vacuum pump or other suction device denoted 101 (FIG. 3). The cavity 10 is partly enclosed, at the end remote from the suction cup 5, by a bolted flange 13.

The tubular support 4 is accommodated slidably in the cavity 10, projecting from one end to support the suction cup 5 directly by way of a screw fit.

The wall of the tubular support 4 affords first openings 14 (FIG. 1) disposed substantially on the same level as and capable of alignment with the third passage 11, and second openings 15 disposed substantially on the same level as and capable of alignment with the second passage 12. The second openings 15 are noticeably elongated in the axial direction of the tubular support 4.

In addition, the tubular support 4 is capable of movement in relation to the housing 2, tensioned by an external spring 16 loaded between the housing 2 and a shoulder afforded by the end of the tubular support 4 itself.

The hollow piston 6 is accommodated slidably within the tubular support 4, and thus slidable coaxially in relation to the cavity 10 of the housing 2, its movement checked on the one hand by frontal contact with a portion of the flange 13, which functions as a limiter, and on the other hand by the opposing force of a coil spring 17 retained by a circlip 18 seated in the cylindrical cavity 10.

The main bore 6' of the hollow piston 6 is axially disposed, and open at the end directe toward the suction cup 5. In addition to the bore, the piston affords first holes 19 in a position near to the suction cup 5, and second holes 20 farther removed from the suction cup than the first. The distance between the first holes 19 and second holes 20 of the piston is greater than the distance between the first openings 14 and the second openings 15 of the tubular element 4, and greater than that separating the third passage 11 and the second passage 12. In practice, the spacing is such that when either the first or the second holes 19 or 20 are in alignment with the first and second openings 14 and 15, the other holes 20 or 19 remain practically blocked. The hollow piston 6 is invested with movement in opposition to the coil spring 17 by the mechanical control means 7, which are illustrated partly in FIG. 1 and partly in FIG. 2. Such means 7 comprise a plunger 21, embodied as a shouldered pin or plug and located between the flange 13 and the hollow piston 6, a lever 22 rotatable about a pivot 23 and engaging the plunger 21, and a cam 24 associated rigidly with the fixed frame 8 and in engagement with the lever 22.

The lever 22 is a bellcrank type of which the two arms extend on either side of the pivot 23: a first arm 22a (FIG. 2) impinging on the plunger 21 against the action of the coil spring 17, and a second arm 22b carrying a tappet roller 25 in direct contact with the cam 24.

The cam 24 is connected to the frame 8 by means of a screw 26 passing through a slot 27, in such a way that the cam 24 can be adjusted for height.

As discernible from FIG. 3, the third passage 11 is connected by way of a pipeline 102 with a tank or plenum 103 connected in turn, by way of a pressure reducing valve 104 (conventional) and an on-off valve 105 installed along a further pipeline 10, to a source of compressed air indicated schematically by the block denoted 107. The plenum 103 is also connected by way of an additional pipeline 108 and a relative on-off valve 109, to an air pressure gage 110.

The operation of the delivery system 100 will now be described, assuming that the task performed by the suction cup 5 associated with the valve 1 is one of picking up single sheets 111 in succession from the bottom of a stack 112 (FIG. 3).

With the roller 25 positioned against the cam 24, the hollow piston 6 is held in a raised position by the first arm 22a of the lever 22, the result being that the suction cup 5 is connected to the vacuum pump 101 by way of the second holes 20, the second openings 15 and the second passage 12. Thereafter, the suction cup 5 remains negatively pressurized even when bearing down on the tubular support 4 to the point of touching bottom dead center, by virtue of the especially elongated geometry of the second openings 15. The movements of the tubular support 4 are governed by the external spring 16, the purpose of which being essentially to ensure that with the suction cup 5 at bottom dead center and in contact with a sheet of material 111, this contact will be maintained for a given lapse of time. This allows the suction cup 5 to establish a firm grip on the sheet 111, and ensures that the circuit between the vacuum pump 101 and the cup 5 can be depressurized sufficiently to guarantee a positive detachment of the sheet 111 from the stack 112. In addition, the spring 16 can compensate for minor irregularities in the sheet to be picked up, due perhaps to slight distortions in the material.

Figure 2:
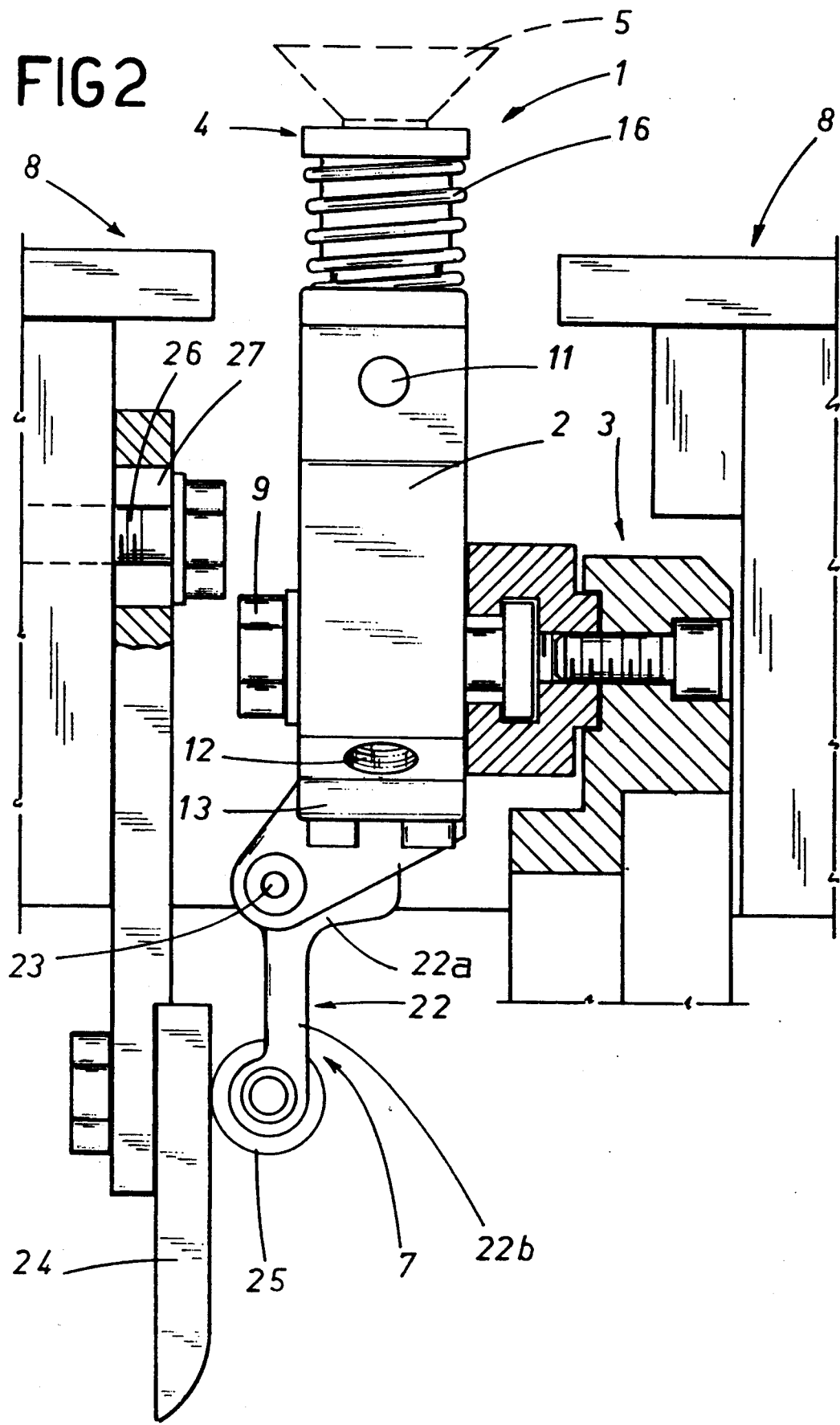
FIG. 2 illustrates the valve of FIG. 1, rotated through 90°, and the parts of the machine directly adjacent to the valve.

When the roller 25 is separated from the cam 24, as a result of the movable support 3 descending and drawing the entire valve 1 downwards, the assembly of internal components will be in the configuration of FIG. 1. Accordingly, communication between the second passage 12 and the first passage 6' remains inhibited, whilst the suction cup 5 is connected by way of the first holes 19 and the first openings 14 to the third passage 11. In this situation, the suction cup 5 connects momentarily with the source of compressed air 107, with the result that the negative pressure generated previously between the upwardly directed surface of the suction cup 5 and the downwardly directed surface of the sheet 111 is dissipated substantially on the instant, and indeed replaced by a pressure greater than atmospheric (adjustable as appropriate by means of the control valve 104), such as will cause the sheet 111 to separate immediately from the suction cup 5.

The objects state at the outset are thus realized. It will be evident, in fact, that with the suction cup 5 connected cyclically and in alternation to the source of compressed air 107 and the source of negative pressure, the air delivery system 100 can be utilized to gain precision control over, and in practice, eliminate the time needed to neutralize the suction generated through a set of cups 5 on completion of the operating cycle, thereby ensuring faultless and reliable operation of the machine in which the suction cups 5 are installed, even at ultra-high operating speeds.

What is claimed:

1. A system for delivering air to at least one suction cup forming part of a machine operating at high speed, comprising a valve mounted to a movable support and composed of:
   a housing, providing mechanical support to at least one suction cup and affording a substantially cylindrical cavity interconnecting a first passage in communication with the suction cup, a second passage connected to suction means, and a third passage located adjacent to the suction cup and connected to a source of compressed air;
   a hollow piston, of which the bore coincides with the first passage, capable of sliding movement internally of and coaxially with the cavity against spring means and affording holes disposed in such a manner as to allow of alignment respectively and alternately with the second and the third passage, according to the position of the piston;
   mechanical control means serving to synchronize the movement of the piston with the movements of the movable support.

2. An air delivery system as in claim 1, comprising a plenum interposed between the third passage and the source of compressed air.

3. An air delivery system as in claim 2, comprising a pressure control device interposed between the third passage and the source of compressed air.

4. An air delivery system as in claim 3, comprising a pressure gage connected to the plenum.

5. An air delivery system as in claim 2, comprising a pressure gage connected to the plenum.

6. An air delivery system as in claim 1, comprising a pressure control device interposed between the third passage and the source of compressed air.

7. An air delivery system as in claim 6, comprising a plenum and a pressure gage connected to the plenum.

* * * * *